United States Patent
Uemura

(10) Patent No.: US 10,942,694 B2
(45) Date of Patent: Mar. 9, 2021

(54) PRINTING SYSTEM, TERMINAL APPARATUS AND PRINT SETTING METHOD FOR SETTING THE PRINT SETTINGS BY APPLYING SPECIFIC SETTING DATA SET

(71) Applicant: SHARP KABUSHIKi KAISHA, Sakai (JP)

(72) Inventor: Atsushi Uemura, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 0 days.

(21) Appl. No.: 16/680,982

(22) Filed: Nov. 12, 2019

(65) Prior Publication Data
US 2020/0159478 A1 May 21, 2020

(30) Foreign Application Priority Data
Nov. 15, 2018 (JP) .............................. JP2018-214858

(51) Int. Cl.
*G06F 3/12* (2006.01)
(52) U.S. Cl.
CPC .......... *G06F 3/1255* (2013.01); *G06F 3/1205* (2013.01); *G06F 3/1254* (2013.01); *G06F 3/1257* (2013.01); *G06F 3/1285* (2013.01)
(58) Field of Classification Search
None
See application file for complete search history.

(56) References Cited

U.S. PATENT DOCUMENTS

| 2007/0106995 | A1* | 5/2007 | Osaka | G06Q 10/06 718/106 |
| 2010/0033759 | A1* | 2/2010 | Motokado | G06F 3/1239 358/1.15 |
| 2018/0267750 | A1* | 9/2018 | Kobayashi | G06F 3/1258 |

FOREIGN PATENT DOCUMENTS

JP 2010-039926 A 2/2010

* cited by examiner

*Primary Examiner* — Andrew H Lam
(74) *Attorney, Agent, or Firm* — ScienBiziP, P.C.

(57) ABSTRACT

A printing system includes a terminal apparatus with a printer driver that is installed in the terminal apparatus and generates data for an image formation apparatus based on print setting, and a server apparatus. The terminal apparatus and the server apparatus are connected to each other. The server apparatus includes a first setting device that sets specific setting data relating to the print setting, and an application device that applies the specific setting data to the terminal apparatus. The terminal apparatus includes a storage that stores setting data representing setting of the terminal apparatus, a reflector that reflects the specific setting data in the setting data, and a controller that refers to the setting data to perform control to modify the print setting.

7 Claims, 14 Drawing Sheets

FIG. 2

| NAME | TYPE | DATA |
|---|---|---|
| (DEFAULT) | REG_SZ | (NO VALUE SETTING) |
| AutoJobControl.. | REG_DWORD | 0x00000000 (0) |
| ColorMode | REG_DWORD | 0x00000000 (0) |
| DocumentFiling | REG_DWORD | 0x00000002 (2) |
| Duplex | REG_DWORD | 0x00000002 (2) |
| ForcedBW | REG_DWORD | 0x00000000 (0) |
| ForcedDuplex | REG_DWORD | 0x00000000 (0) |

- EUDC
- Keyboard Layout
- Network
- Printers
- Software
  - AppDataLow
  - Classes
  - ODBC
  - Policies
    - AAA
    - BBB
    - MFC
      - PrintSettings
- System
  - CurrentControlSet
    - Control
    - DeviceContain

| NAME | DATA | SELECTION PARAMETER |
|---|---|---|
| Duplex | 0x00000001(1) | None |
| | 0x00000002(2) | Long Edge |
| | 0x00000003(3) | Short Edge |

FIG. 9B

| NAME | DATA | SELECTION PARAMETER |
|---|---|---|
| ForcedDuplex | 0x00000000(0) | OFF |
| | 0x00000002(2) | Long Edge |
| | 0x00000003(3) | Short Edge |

PRINTING SYSTEM, TERMINAL APPARATUS AND PRINT SETTING METHOD FOR SETTING THE PRINT SETTINGS BY APPLYING SPECIFIC SETTING DATA SET

BACKGROUND OF THE INVENTION

Field of the Invention

The present disclosure relates to a printing system, a terminal apparatus, and a print setting method.

Description of the Background Art

Recently, when using a printer driver to print with a printer, a user uses a specific application to create document data, and performs printing from the application via the printer driver.

Further, the technology relating to an information processing apparatus has been proposed. The information processing apparatus may be provided as a client apparatus used in a printing system. The printing system has a client apparatus connected to an image forming apparatus via a network, and a server apparatus that manages setting parameters of printing conditions that can be set on the client apparatus. The information processing apparatus comprises a judgment unit for judging whether the information processing apparatus is a client apparatus with reference to identification information concerning the image formation apparatus stored inside the information processing apparatus, and a setting screen controller for providing a setting screen that allows a user to select the setting parameters if the information processing apparatus is not the client apparatus, and that allows a user to modify setting values of the selected setting parameters and prevents the user from modifying setting values of the remaining setting parameters if the information processing apparatus is the client apparatus (see, for example, Japanese Unexamined Patent Application Publication No. 2010-39926).

However, the technology described in Japanese Unexamined Patent Application Publication No. 2010-39926 presumes the use of a Point & Print function which is an installation method in which the printer driver is copied from a server PC to a client PC by specifying a shared printer for a server PC from a client PC. In this case, it is necessary to install the printer driver in the server apparatus and the client apparatus. Further, if there are multiple shared printers to which the client apparatus is connected, it is necessary for the server apparatus to install the printer driver in each of the shared printers. Therefore, there is the problem that the management effort is large.

In consideration of the aforementioned problem, it is an object of the present disclosure to provide a printing system and the like in which the print settings can be properly set by applying specific setting data set in the server apparatus to the terminal apparatus.

SUMMARY OF THE INVENTION

In order to solve the aforementioned problem, a printing system of the present disclosure includes a terminal apparatus with a printer driver that is installed in the terminal apparatus and generates data for an image formation apparatus based on print setting, and a server apparatus, the terminal apparatus and the server apparatus being connected to each other, the server apparatus including, a first setting device that sets specific setting data relating to the print setting, and an application device that applies the specific setting data to the terminal apparatus, and the terminal apparatus including, a storage that stores setting data representing setting of the terminal apparatus, a reflector that reflects the specific setting data in the setting data, and a controller that refers to the setting data to perform control to modify the print setting.

A terminal apparatus of the present disclosure is a terminal apparatus with a printer driver that is installed in the terminal apparatus and generates data for an image formation apparatus based on print setting, the terminal apparatus being connectable with a server apparatus and comprising, a storage that stores setting data representing setting of the terminal apparatus, a reflector that reflects specific setting data set in the server apparatus in the setting data, and a controller that refers to the setting data to perform control to modify the print setting.

A print setting method of the present disclosure is a method for print setting in a printing system including, a terminal apparatus with a printer driver that is installed in the terminal apparatus and generates data for an image formation apparatus based on print setting, and a server apparatus, the terminal apparatus and the server apparatus being connected to each other, the method comprising, setting, with the server apparatus, specific setting data relating to the print setting, applying, with the server apparatus, the specific setting data to the terminal apparatus, storing, with the terminal apparatus, setting data representing setting of the terminal apparatus, reflecting, with the terminal apparatus, the specific setting data in the setting data, and referring, with the terminal apparatus, to the setting data to modify the print setting.

According to the present disclosure, the print settings can be properly set by applying specific setting data set in the server apparatus to the terminal apparatus.

BRIEF DESCRIPTION OF THE DRAWINGS

FIG. 2 is a diagram illustrating an operational example of the present embodiment.

FIG. 9A and FIG. 9B are diagrams illustrating operational examples of the present embodiment.

DESCRIPTION OF THE PREFERRED EMBODIMENTS

Hereinafter, an embodiment of the present disclosure will be described with reference to the drawings. Note that, the embodiment described below is one example for specifying the present disclosure. Therefore, the contents of the present disclosure are not limited to the contents described in the embodiment.

1. Entire Configuration

Figure 1:
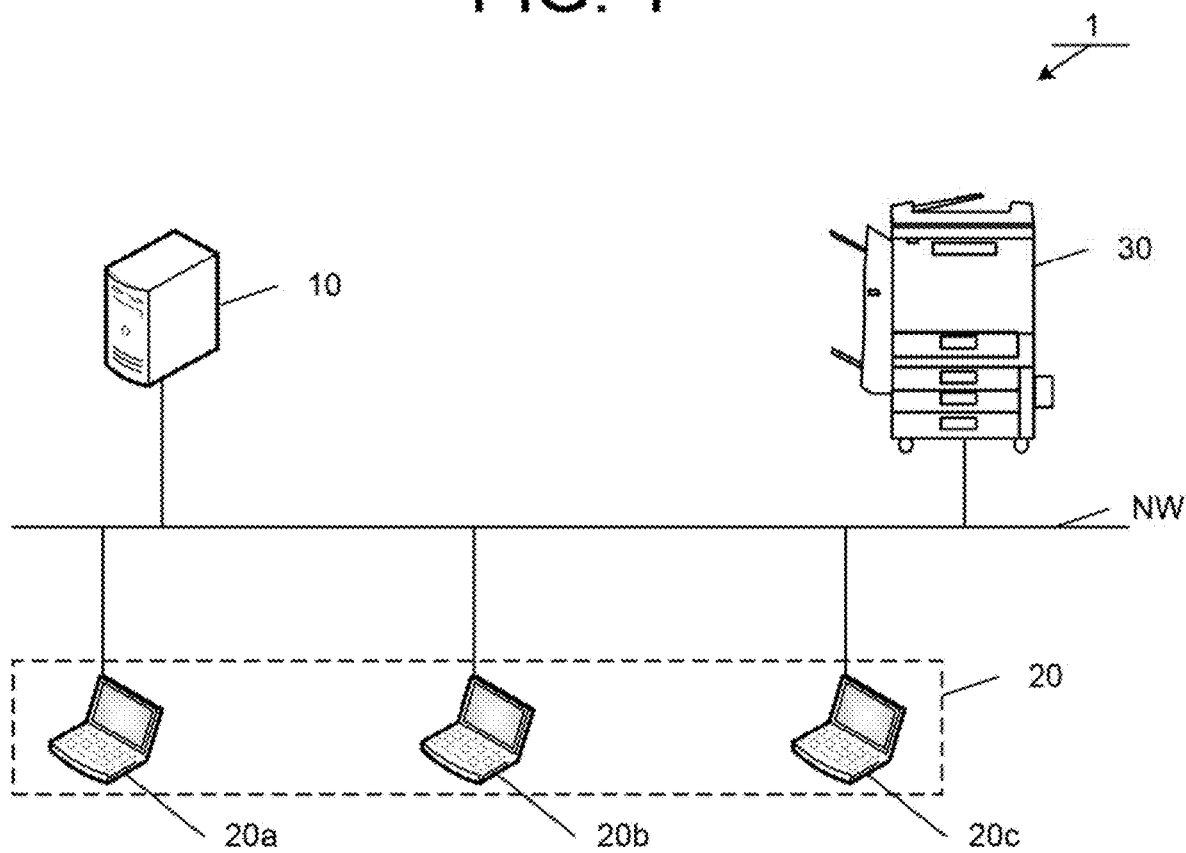
FIG. 1 is a diagram for describing the entire configuration of a printing system of the present embodiment.

First, the entire configuration of a printing system 1 of the present embodiment will be described based on FIG. 1. As illustrated in FIG. 1, the printing system 1 is provided by connecting a server apparatus 10, a terminal apparatus 20, and an image formation apparatus 30 via a network NW. The network NW is exemplified that the server apparatus 10, the terminal apparatus 20, and the image formation apparatus 30 are connected by a local area network (LAN), but may be a connection method other than LAN. For example, the above apparatuses may be connected by an internet network via an external network such as long term evolution (LTE)/5G.

The server apparatus 10 is an information processing apparatus that manages the terminal apparatus 20. The server apparatus 10 is constituted by, for example, a personal computer (PC).

The terminal apparatus 20 is an information processing apparatus that transmits data (print data) to the image formation apparatus 30, the data can be printed by the image formation apparatus 30. The terminal apparatus 20 is constituted by, for example, a personal computer (PC), but may be constituted by a apparatus such as a tablet or a smartphone.

Here, the terminal apparatus 20 is installed with program that makes the creation or the editing of document data possible. The document data is data in a predetermined format which is created or edited by a user of the terminal apparatus 20, and is, for example, text data, presentation data and image data.

Further, the terminal apparatus 20 has installed a printer driver which is a program for transmitting the print data to the image formation apparatus 30. The printer driver has a function of changing the document data to print data. The print data is data that the image formation apparatus 30 can process, and is data representing the contents to be printed by the image formation apparatus 30. The print data is, for example, image data for each page. By the print data being the image data for each page, the image formation apparatus 30 can output the contents of the document data to a recording sheet one page at a time without installing a program which interprets the document data. Note that, the print data may be page description language (PDL) data, and may also be data which lists the print commands.

The printer driver transmits the print data and the print setting data to the image formation apparatus 30. Moreover, the image formation apparatus 30 forms the print data on a recording medium (for example, recording paper) according to the print setting indicated by the print setting data based on the print data transmitted from the terminal apparatus 20 and the print setting data.

The print setting data is the data to set a printing method when the image formation apparatus 30 prints based on the print data, and is the data representing the contents of the print setting (printing conditions). The print setting data includes, for example, a setting parameter for "two-sided printing", and a setting value for "one-sided printing". Other setting parameters may include a setting of color mode, a setting of intensive printing, a setting of the size of a paper to be output, a setting of the magnification/reduction rate and the like.

The printer driver may also have a function of displaying a print setting screen which is a screen for modifying each setting value on a display section (for example, a display) controlled by the terminal apparatus 20. The user of the terminal apparatus 20 can modify the setting values by operating the print setting screen.

Here, the printer driver reads the specific setting data relating to the print setting from the setting data stored in the terminal apparatus 20 when the print setting screen is displayed, and modifies the setting values of the print setting data. The setting data is data representing the overall setting of the apparatus, and is, for example, the data (the registry data) stored in the Windows (registered trademark) registry. The setting data of the terminal apparatus 20 is the data in which the information relating to the user of the terminal apparatus 20, the information of the hardware included in the terminal apparatus 20 and the information relating to the system of the terminal apparatus 20 is stored.

FIG. 2 is a diagram illustrating an example of the registry data which is the setting data. The registry is a database having a hierarchical structure, and the respective hierarchies are identified by a registry key.

FIG. 2 is a diagram illustrating the state in which the value of the registry key "Print Settings" among the registry data is displayed. As illustrated in FIG. 2, one or a plurality of values are stored for one registry key. As an example of the value of the registry key "Print Settings", for example, as illustrated in D100, a value of "Forced Duplex=0x00000000 (0)" is stored. The contents indicated by the value of the registry key are interpreted by the program that reads the value of the registry key.

Here, the value of the registry key "Print Settings" which is a part of the registry data is used as the specific setting data relating to the print setting. Moreover, the printer driver interprets the value of the registry key "Print Settings", modifies the display contents of the print setting screen, and modifies the setting values included in the print setting data.

For example, the terminal apparatus 20 reads out the value of the registry key "Print Settings" from the registry data when the print setting screen is displayed. When the value relating to the setting value (standard setting value) which is to be preferentially set is included in the value of the registry key "Print Settings", the printer driver modifies the setting values corresponding to the predetermined setting parameters in the print setting screen, and then displays the print setting screen. That is, with regards to the setting value of the predetermined setting parameter, if the user does not modify the setting value, the standard setting value is preferentially set.

Further, if the value relating to the setting value which cannot be set by a user is included in the value of the registry key "Print Settings", the printer driver edits the setting value which cannot be set by the user to the print setting screen which cannot be selected, and then displays the print setting screen. For example, it is assumed that a value indicating that the user cannot select "one-sided printing" is stored as the setting value "two-sided printing" among the print setting data. In such a case, the printer driver displays on the print setting screen that "one-sided printing" cannot be selected by the user as the setting value of the setting parameter "two-sided printing". For example, if the print setting screen provided by the printer driver is the screen to select one parameter from the list for the setting value "two-sided printing", the parameter "one-sided printing" is not displayed among the parameters in the list to select the setting value "two-sided printing". In this way, the user cannot set the print setting to print the print data on one side of the recording paper. That is, including "one-sided printing" which is the setting for printing and outputting the print data on one side of the recording paper as the setting values of the print setting data is restricted, and the print data is output on both sides of the recording paper.

Depending on the program for creating or editing the document data, the screen that modifies the print setting data (setting value) may be provided in the program, and the modification of the print setting data may be performed without use of the print setting screen provided with the printer driver. Even in this case, the printer driver reads out the value of the registry key "Print Settings" from the registry data before transmitting the print setting data to the image formation apparatus 30. Moreover, if the value relating to the setting value which cannot be set by a user is included in the value of the registry key "Print Settings", the printer driver forcibly modifies the corresponding setting value for the print setting data that includes the setting value which cannot be set by a user. For example, if the inclusion of "one-sided printing" is restricted as the setting value of the print setting data, and the setting value "two-sided printing" is the one-sided printing" as the print setting data, the printer driver modifies the setting value to a setting value (for example, "Long Edge") other than "one-sided printing". As a result, the print data is not output to one side of the recording paper, but is output to both sides of recording paper. Therefore, even if the user set the print setting data without using the print setting screen, the printer driver forcibly modifies the value of the print setting data based on the setting data.

Note that, it is described that the setting data of the present embodiment includes the information of the setting value which cannot be selected by the user, and the information of the value to be preferentially set when the print setting screen is displayed. Further, the setting data of the present embodiment is the registry data, the specific setting data is a part of the registry data, and is described as the value of the registry key relating to the print setting.

In the present embodiment, the value of the registry key relating to the print setting applied to the terminal apparatus 20 is also stored as the value of the registry key relating to the print setting in advance in the registry data of the server apparatus 10. Moreover, the server apparatus 10 applies (transmits) the value of the registry key relating to the print setting stored in the server apparatus 10 to the terminal apparatus 20 by the function of the Active Directory (registered trademark). The terminal apparatus 20 reflects (updates) the value of the registry key relating to the print setting applied (received) from the server apparatus 10 in the registry data which is already stored. In this way, an administrator of the printing system 1 can apply the value of the registry key relating to the print setting in the terminal apparatus 20 by setting the value of the registry key relating to the print setting in the server apparatus 10.

2. Functional Configuration 2.1 Server Apparatus

Figure 3:
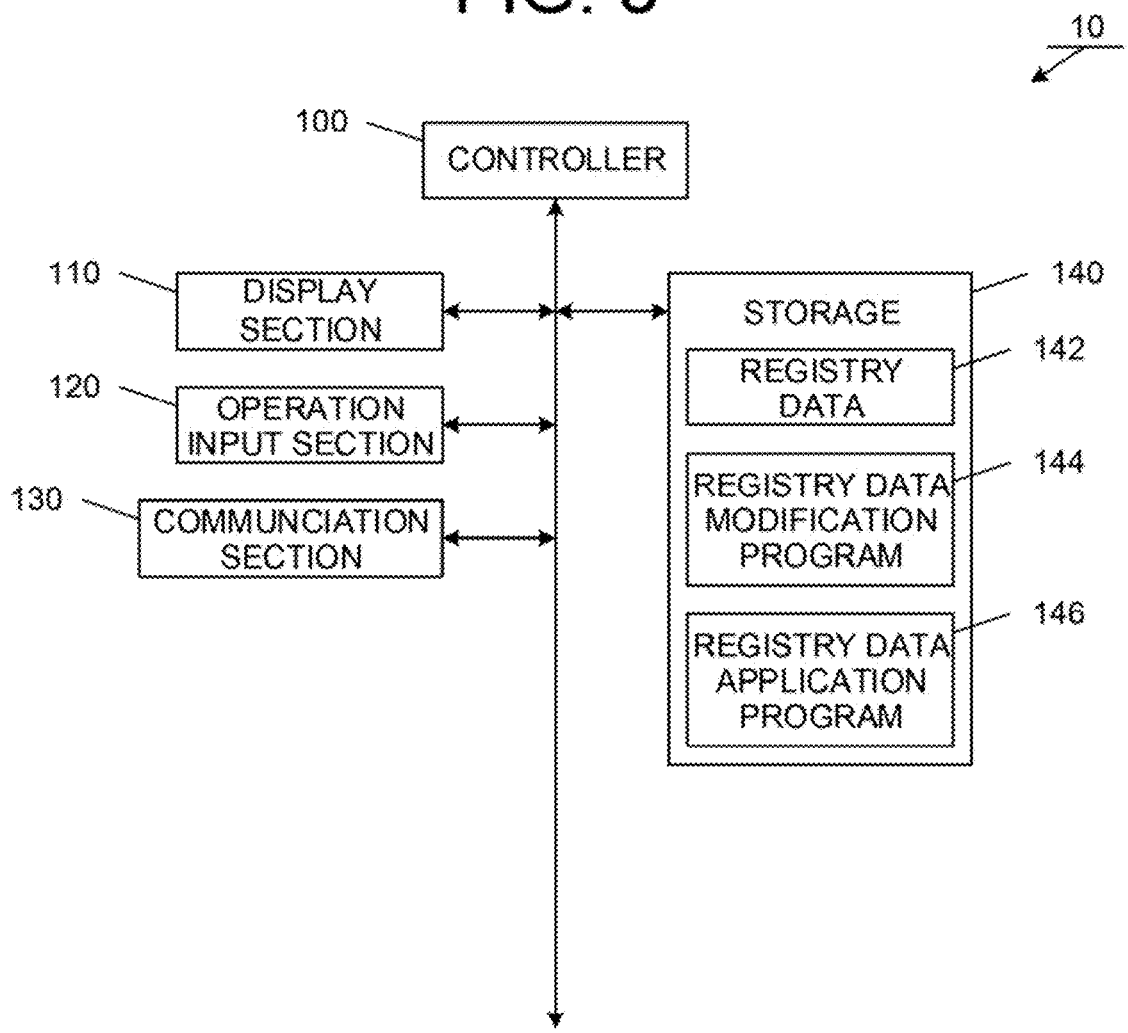
FIG. 3 is a diagram for describing a functional configuration of a server apparatus of the present embodiment.

The functional configuration of the server apparatus 10 will be described with reference to FIG. 3. As illustrated in FIG. 3, the server apparatus 10 is constituted by a controller 100, a display section 110, an operation input section 120, a communication section 130, and a storage 140.

The controller 100 is a functional section that controls the entirety of the server apparatus 10. The controller 100 realizes various functions by reading out and executing various programs, and is constituted by one or a plurality of arithmetic devices (for example, a central processing unit (CPU)).

The display section 110 is a functional section that displays various information to a user, and is constituted by, for example, a liquid crystal display (LCD), an organic EL display and the like. Note that, the present embodiment describes a configuration having the display section 110 in the server apparatus 10 as an example, but the configuration may be, for example, a device connected to an external display. That is, the configuration may be a device configured as a display control device, that performs control to be displayed on an external display section connected by an HDMI (registered trademark) or the like.

The operation input section 120 is a functional section by which a user performs various operations. The operation input section 120 is constituted by various operation devices such as a mouse and a keyboard.

The communication section 130 is a functional section for the server apparatus 10 to communicate with an external apparatus. For example, the communication section 130 is constituted by a network interface card (NIC) used by a wireless LAN and a communication module which may be connected to a long term evolution (LTE)/LTE-Advanced (LTE-A)/license-assisted access using LTE (LAA)/5G network.

The storage 140 is a functional section that stores various programs may be necessary for the operation of the server apparatus 10 and various data. The storage 140 is constituted by, for example, a solid state drive (SSD) which is a semiconductor memory, a hard disk drive (HDD) or the like.

Registry data 142 which is the data representing the setting of the server apparatus 10, a registry data modification program 144 and a registry data application program 146 are stored in the storage 140.

The registry data modification program 144 is a program that modifies the value of the registry key relating to the print setting among the registry data 142. The registry data modification program 144 displays the registry data setting screen (first setting device) for displaying and setting the value of the registry key relating to the print setting in the display section 110 by reading out with the controller 100 and executing. The registry data setting screen is, for example, the screen of a group policy editor to set the group policy which is an Active Directory function. The registry data modification program 144 stores (updates) the value set by the user in the registry data 142 when the user performs the operation which applies the value of the registry key relating to the print setting.

The registry data application program 146 is a program that reads out the registry data 142, and applies the value of the registry key relating to the print setting to the terminal apparatus 20 managed by the server apparatus 10. The registry data application program 146 applies the value of the registry key relating to the print setting to the terminal apparatus 20 when the value of the registry key relating to the print setting is stored in the registry data setting screen. Note that, the timing at which the registry data application program 146 applies the value of the registry key relating to the print setting to the terminal apparatus 20 may be periodical (for example, hourly), and may be a time specified in advance (for example, daily at 00:00).

2.2 Terminal Apparatus

Figure 4:
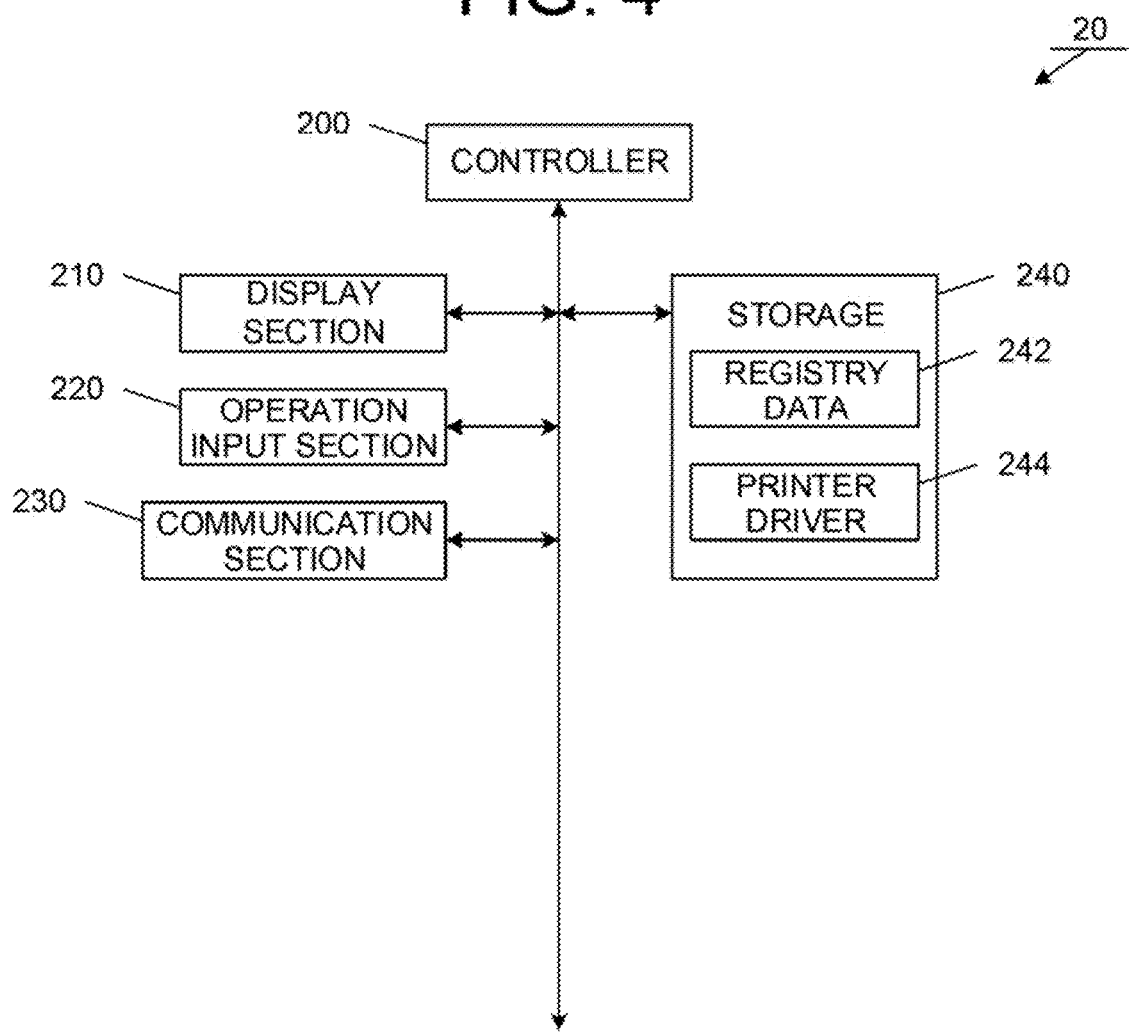
FIG. 4 is a diagram for describing a functional configuration of a terminal apparatus of the present embodiment.

The functional configuration of the terminal apparatus 20 will be described with reference to FIG. 4. As illustrated in FIG. 4, the terminal apparatus 20 is constituted by a controller 200, a display section 210, an operation input section 220, a communication section 230 and a storage 240.

The controller 200 is a functional section that performs control the entirety of the terminal apparatus 20. The controller 200 realizes various functions by reading out and executing various programs, and is constituted by one or a plurality of arithmetic devices (for example, a CPU).

The display section 210 is a functional section for displaying various information to a user, and is constituted by, for example, an LCD, an organic EL display and the like. Note that, the present embodiment describes a configuration having the display section 210 in the terminal apparatus 20 as an example, but the configuration may be, for example, a device connected to an external display.

The operation input section 220 is a functional section by which a user performs various operations. The operation input section 220 is constituted by various operation devices such as a mouse and a keyboard.

The communication section 230 is a functional section for the terminal apparatus 20 to communicate with an external apparatus. For example, the communication section 230 is constituted by an NIC used by a wireless LAN and a communication module which may be connected to an LTE/LTE-A/LAA/5G network.

The storage 240 is a functional section that stores various programs necessary for the operation of the terminal apparatus 20 and various data. The storage 240 is constituted by, for example, an SSD which is a semiconductor memory, an HDD or the like.

Registry data 242 which is the data representing the setting of the terminal apparatus 20 and a printer driver 244 are stored in the storage 240.

The printer driver 244 is a program that changes the document data to the print data, and displays the print setting screen (the second setting device) which is the screen for modifying the print setting data on the display section 210.

2.3 Image Formation Apparatus

Figure 5:
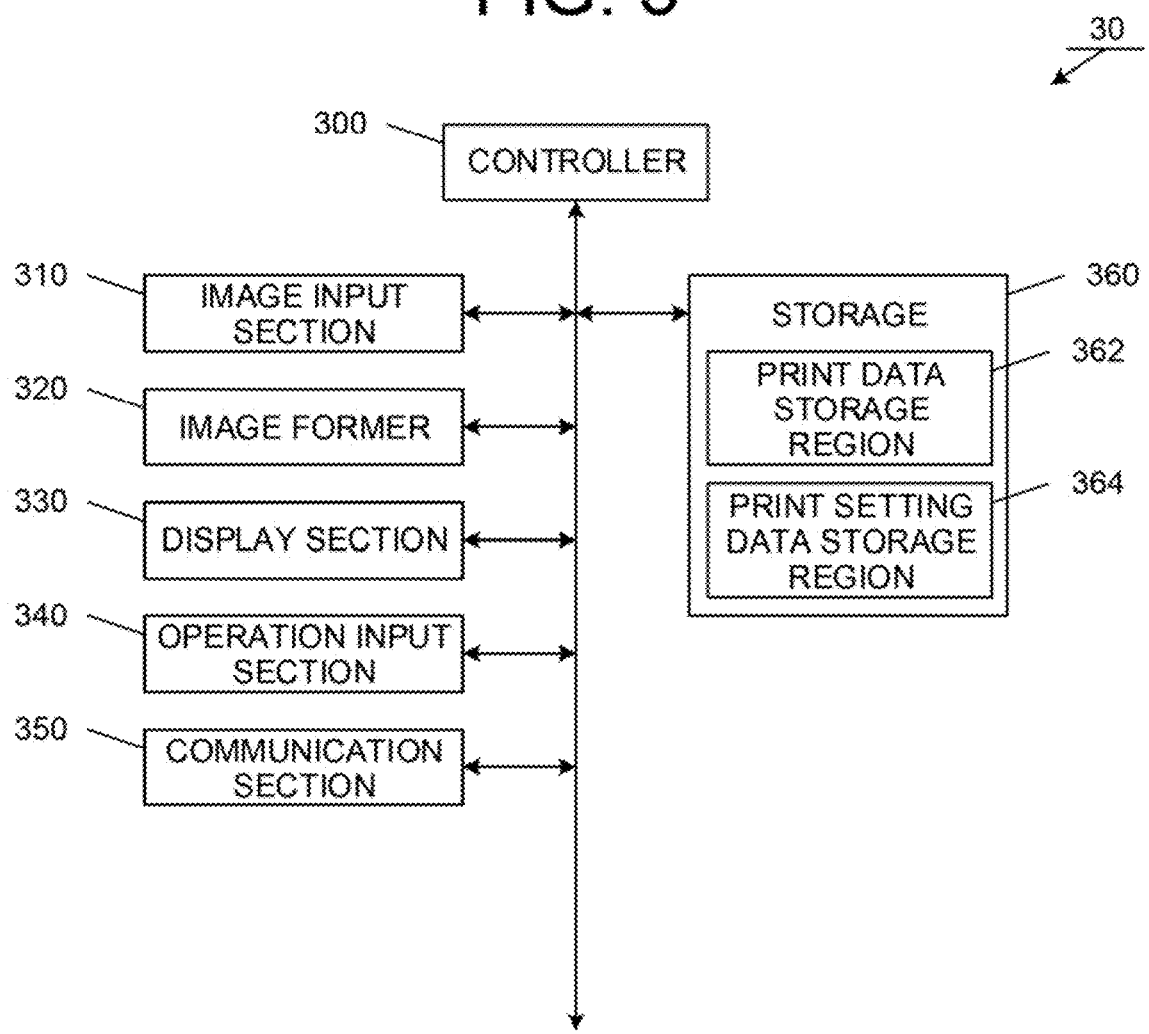
FIG. 5 is a diagram for describing a functional configuration of an image formation apparatus of the present embodiment.

The functional configuration of the image formation apparatus 30 will be described with reference to FIG. 5. As illustrated in FIG. 5, the image formation apparatus 30 is constituted by a controller 300, an image input section 310, an image former 320, a display section 330, an operation input section 340, a communication section 350 and a storage 360.

The controller 300 is a functional section that performs control the entirety of the image formation apparatus 30. The controller 300 realizes various functions by reading out and executing various programs, and is constituted by of one or a plurality of arithmetic devices (for example, a CPU).

The image input section 310 is a functional section that reads the image data input into the image formation apparatus 30. For example, the image input section 310 is connected to a document reading device such as a scanner, and inputs the image data output from the document reading device. Further, the image data may be input from a storage medium such as a universal serial bus (USB) memory or an SD card.

The image former 320 is a functional section which stores the output data stored in the print data storage region 362 in the print setting data storage region 364, for forming a recording medium (for example, a recording paper) based on the print setting data corresponding to the output data. For example, the image forming unit is constituted by a laser printer which uses an electrophotographic method.

The display section 330 is a functional section that displays various information to a user. For example, the display section 330 is constituted by an LCD and the like. Further, the operation input section 340 is the functional section by which a user performs various operations. For example, the operation input section 340 is constituted by a touch panel provided on the display section 330. The detection of a touch on the touch panel is realized by an electrostatic induction method, a pressure-sensitive method, or a well-known technique. Note that, the operation input section 340 may also be realized by a hard key, and may be a combination of the touch panel and the hard key.

The communication section 350 is a functional section for the image formation apparatus 30 to communicate with an external apparatus. For example, the communication section 350 is constituted by an NIC used by a wireless LAN and a communication module which may be connected to an LTE/LTE-A/LAA/5G network.

The storage 360 is a functional section that stores various programs necessary for the operation of the image formation apparatus 30. The operation input section 340 is constituted by, for example, an SSD which is a semiconductor memory, an HDD or the like.

The print data storage region 362 which is the region to store the print data received from the terminal apparatus 20 and the print setting data storage region 364 which is the region to store the print setting data received from the terminal apparatus 20 are secured in the storage 360. By storing the print data and the print setting data is association with each other, the image former 320 forms the print data on the recording medium based on the print setting data.

3 Process Flow

3.1 Process Flow of Server Apparatus

Figure 6:
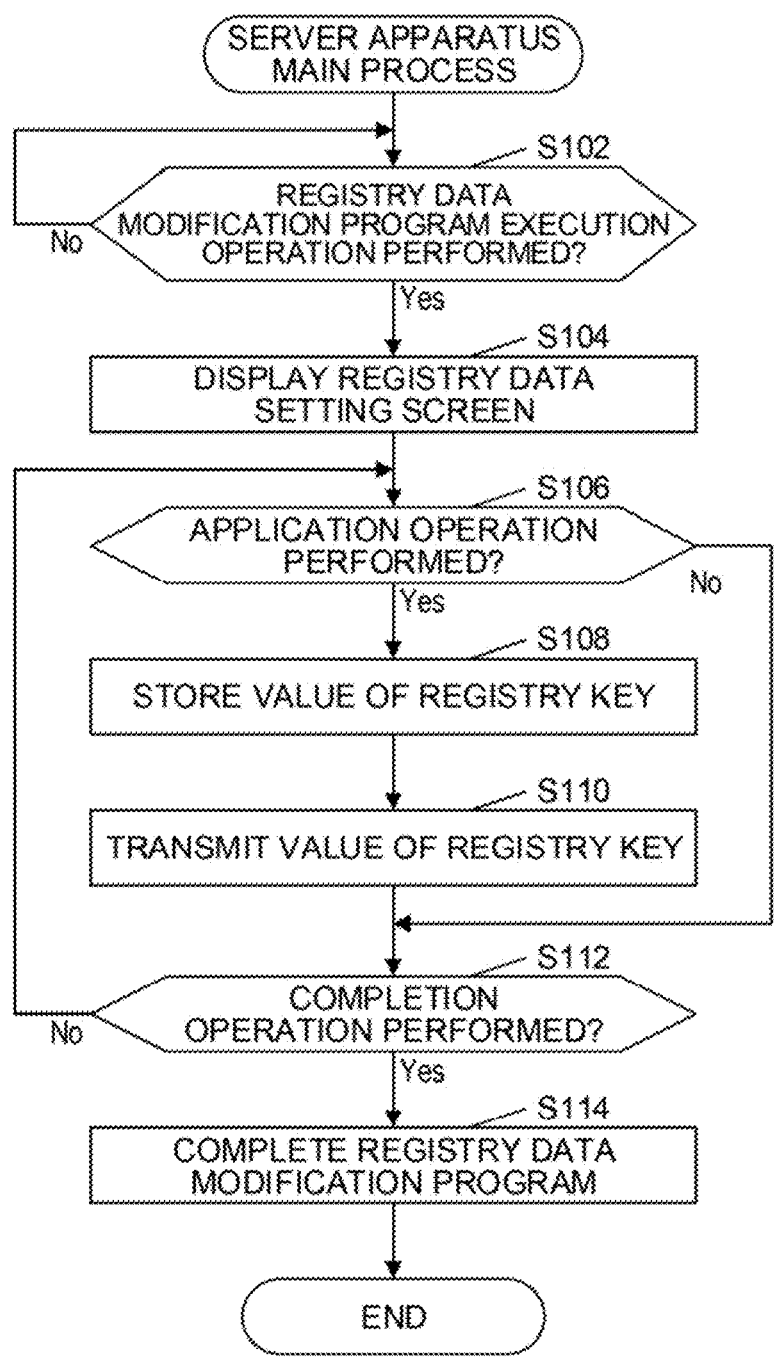
FIG. 6 is a flow diagram illustrating a flow of a main processing of a server apparatus of the present embodiment.

The flow of the processes in the present embodiment will be described with reference to the drawings. First, the flow of the process of the server apparatus 10 will be described with reference to FIG. 6.

First, the controller 100 determines whether a registry data modification program execution operation which is the operation which executes a registry data modification program has been performed by the user (Step S102). The registry data modification program execution operation displays, for example, the group policy editor relating to the print setting on the display section 110. When the registry data modification program execution operation is performed, the controller 100 displays the registry data setting screen on the display section 110 by reading out and executing the registry data modification program 144 (Step S102; Yes→Step S104).

Next, the controller 100 determines whether an application operation which is an operation that applies the value of the registry key relating to the print setting has been performed by the user (Step S106). The application operation is an operation by which the user selects, for example, an "Apply" button displayed on the registry data setting screen. When the application operation is performed, the controller 100 stores the value of the registry key relating to the print setting set by the user in the registry data 142 (Step S106; Yes→Step S108). Further, the controller 100 transmits the value of the registry key relating to the print setting stored in the registry data 142 to the terminal apparatus 20 by a function of reading out and realizing the registry data application program 146 (Step S110).

Next, the controller 100 completes the registry data modification program, if a completion operation which is an operation by which the user completes the registry data modification program is performed (Step S112; Yes→Step S114). The completion operation is an operation by which, for example, a "Cancel" button that is displayed on the registry data setting screen is selected by the user. Note that, if the completion operation is performed without performing the application operation, the controller 100 may complete the registry data modification program without the value of the registry key relating to the print setting set by the user being stored in the registry data 142. In this case, the value of the registry key relating to the print setting is maintained as is in the registry data 142 when the registry data modification program is executed. If the completion operation has not been performed, the flow returns to Step S106 (Step S112; No→Step S106).

3.2 Process Flow of Terminal Apparatus

Figure 7:
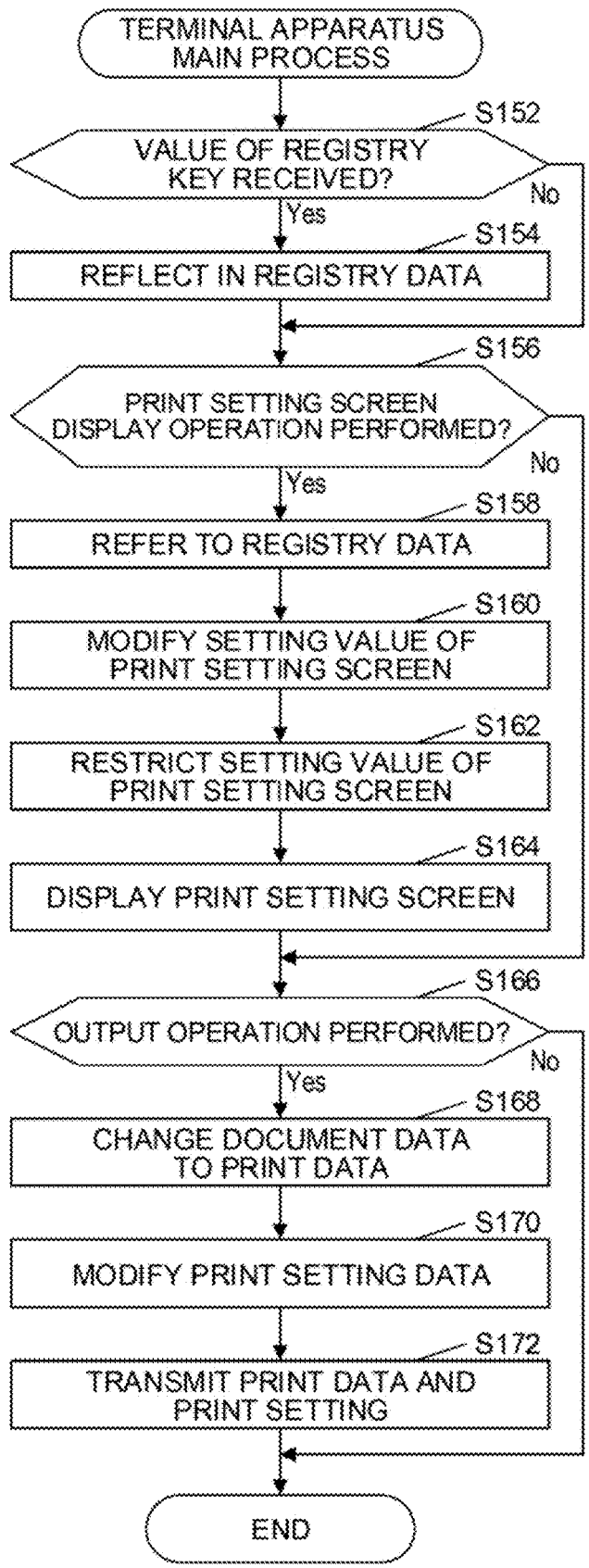
FIG. 7 is a flow diagram illustrating a flow of a main processing of a terminal apparatus of the present embodiment.

Next, the process flow of the terminal apparatus 20 will be described with reference to FIG. 7. First, the controller 200 determines whether the value of the registry key relating to the print setting is received from the server apparatus 10 (Step S152). If the value of the registry key relating to the print setting is received, the controller 200 reflects this by storing the received value of the registry key relating to the print setting in the registry data 242 (Step S152; Yes→Step S154).

Next, the controller 200 determines whether a print setting screen display operation which is an operation that displays the print setting screen has been performed by the user (Step S156). The print setting screen display operation is an operation, for example, by which a user selects a button (for example, the "Properties" button) that displays the print setting screen of the image formation apparatus 30. If the print setting screen display operation is performed, the controller 200 reads out the print setting screen provided in the printer driver 244.

Next, the controller 200 refers to the registry data 242 and reads out the value of the registry key relating to the print setting (Step S158). If the information relating to the standard setting value is included in the read out value of the registry key relating to the print setting, the controller 200 modifies the setting value of the setting parameter of the corresponding print setting screen to the standard setting value based on the information relating to the standard setting value (Step S160). Further, if the information relating to the setting value cannot be selected by the user, the controller 200 restricts the setting values that can be set up by the user to the read out value of the registry key relating to the print setting for the setting parameters of the corresponding print setting screen that cannot be selected by the user (Step S162). For example, if the setting value is set by selecting one parameter among the predetermined parameters (selection parameter), the controller 200 does not display the parameters which cannot be selected by the user from among the parameters.

Next, the controller 200 sets the standard setting values based on the value of the registry key relating to the print setting, and further, displays the print setting screen of which the setting values that can be set are restricted on the display section 210 (Step S164).

Next, the controller 200 determines whether an output operation which is an operation which, based on the print setting data, outputs the print data based on the document data from the image formation apparatus 30 has been performed by the user (Step S166). If the output operation is performed, the controller 200 changes the document data to the print data by a function of reading out and realizing the printer driver 244 (Step S168). Further, if the value of the registry key relating to the print setting is read out from the registry data 242, and the setting value which cannot be selected by the user is included in the print setting data, the controller 200 modifies the setting value that cannot be selected by the user to the setting value that can be selected by the user (Step S170). Moreover, the controller 200 transmits the print data and the print setting data to the image formation apparatus 30 (Step S172).

Note that, the image formation apparatus 30 receives the print data and the print setting data from the terminal apparatus 20, and forms the print data on a recording paper based on the received print data and print setting data.

4. Operational Example

Figure 8:
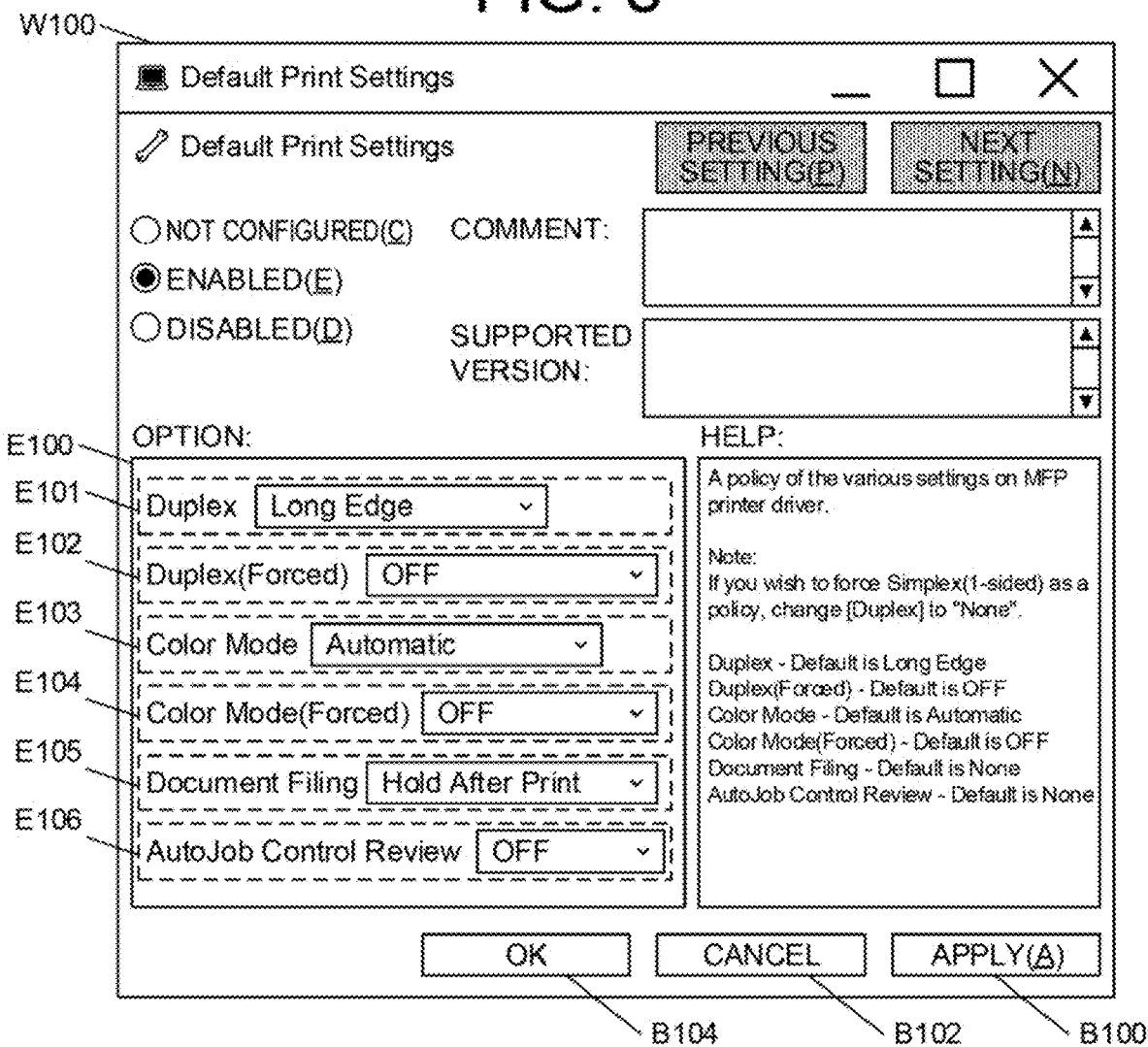
FIG. 8 is a diagram illustrating an operational example of the present embodiment.

An operational example of the present embodiment will be described with reference to FIGS. 8 to 14. FIG. 8 is an example of the display screen W100 of the registry data setting screen. Region E100 which sets the value of the registry key relating to the print setting is included in the display screen W100, and a plurality of lists to select the setting values corresponding to the setting parameters are included in the region E100. FIG. 8 includes a region E101 to set the standard setting value of two-sided printing and a region E102 to set to restrict one-sided printing. In addition thereto, a region E103 to set the standard setting values of the color mode, a region E104 to set to restrict the color mode, a region E105 to set the standard setting value of the function of storing the print data as is in the image formation apparatus 30, and a region E106 to set standard setting value of the function of verifying and confirming the control method of a job during print execution are included.

Furthermore, an apply button B100 that executes the application operation and a cancel button B102 that executes the completion operation are included on the display screen W100. Note that, an OK button B104 that executes the application operation, and completes the registry data modification program as is may also be included.

FIG. 9A is a table illustrating the selection parameters which are the parameters that can be selected in the list of the region E101 and the values (data) stored in the registry data when the selection parameter is selected. That is, any of the parameters "None", "Long Edge" and "Short Edge" can be selected from the list of the region E101. Regarding the selection parameters, "None" means that the standard setting value in the setting parameter "two-sided printing" is set to "None". Note that, setting the setting value of the setting parameter "two-sided printing" to "None" means that the print data is output by one-sided printing. Similarly, regarding the selection parameters, "Long Edge" means that the standard setting value in the setting parameter "two-sided printing" is set to the "Long Edge". Regarding the selection parameters, "Short Edge" means that the standard setting value in the setting parameter "two-sided printing" is set to "Short Edge".

Moreover, for example, when "None" is selected from the selection parameters of the list of the region E101, the value of "Duplex=0x00000001" is stored in the registry data 142 of the server apparatus 10 as the value of the registry key relating to the print setting. Similarly, when "Long Edge" is selected from the selection parameters, the value of "Duplex=0x00000002" is stored in the registry data 142 of the server apparatus 10 as the value of the registry key relating to the print setting. When "Short Edge" is selected from the selection parameter, the value "Duplex=0x00000003" is stored in the registry data 142 of the server apparatus 10 as the value of the registry key relating to the print setting.

FIG. 9B is a table illustrating the selection parameters which are the parameters which can be selected in the list of the region E102 and the values (data) stored in the registry data when the selection parameter is selected. That is, any of the parameters "Off", "Long Edge" or "Short Edge" can be selected from the list of the region E102. The selection parameter "Off" indicates that one-sided printing is not restricted, "Long Edge" indicates that one-sided printing is restricted and makes the long edge as the standard setting value, and "Short Edge" indicates that one-sided printing is restricted and makes the short edge as the standard setting value. When "Long Edge" or "Short Edge" is selected on the list of the region E102, the parameter selected from the list of the region E101 is ignored, and the parameter selected on the list of the region E102 is prioritized.

Further, the parameter selected in the region E102 is stored as the value of the registry key relating to the print setting in the same manner as the region E101. For example, when "Off" is selected, the value of "Forced Duplex=0x00000000" is stored in the registry data 142 of the server apparatus 10 as the value of the registry key relating to the print setting. Similarly, when "Long Edge" is selected from the selection parameters, the value "Forced Duplex=0x00000002" is stored in the registry data 142 of the server apparatus 10 as the value of the registry key relating to the print setting. When "Short Edge" is selected from the selection parameters, the value of "Forced Duplex=0x00000003" is stored in the registry data 142 of the server apparatus 10 as the value of the registry key relating to the print setting. The values of the registry keys stored in this manner are applied to the terminal apparatus 20 from the server apparatus 10.

Figure 10:
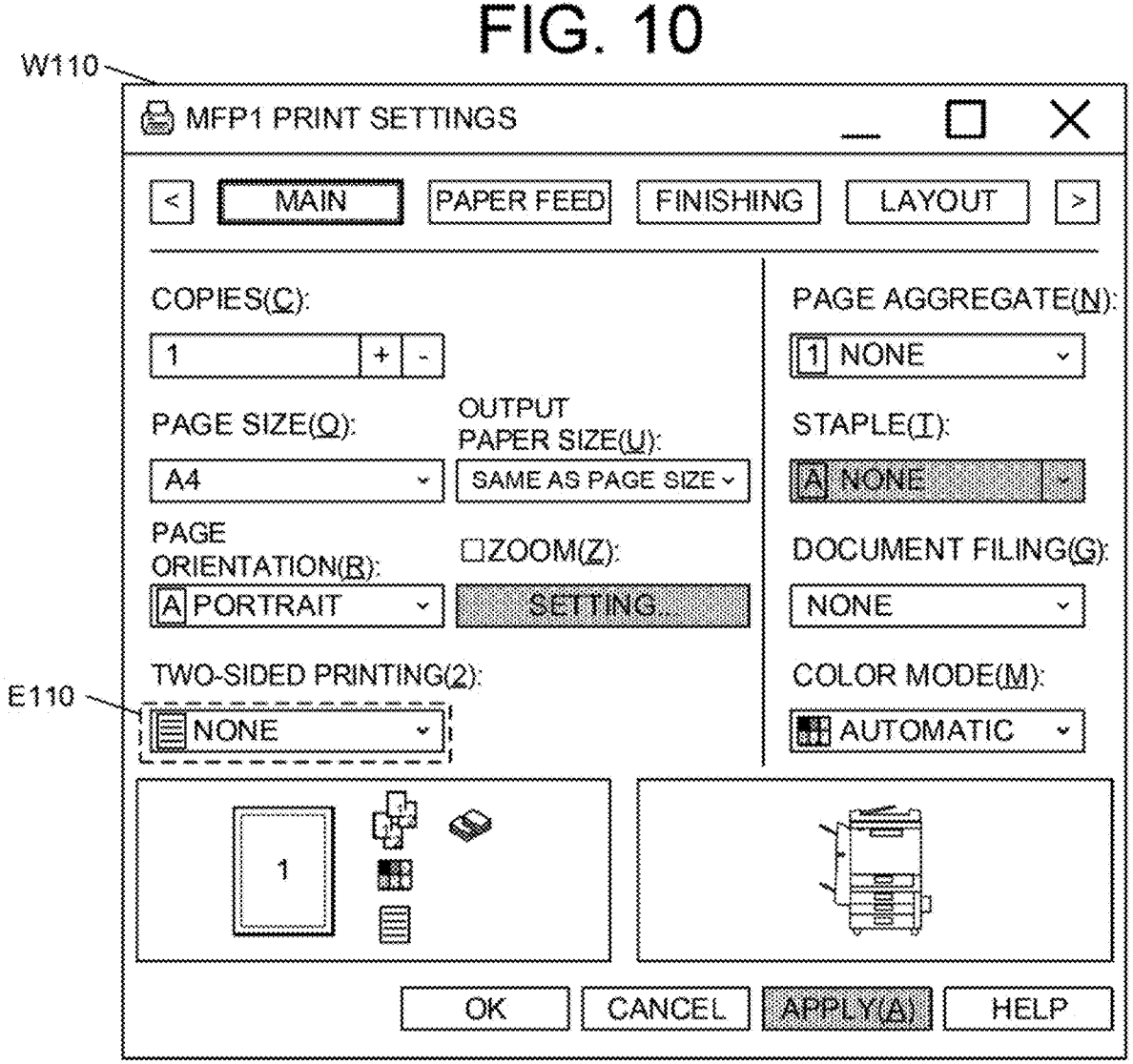
FIG. 10 is a diagram illustrating an operational example of the present embodiment.

FIG. 10 is an example of the display screen W110 of the print setting screen. The list E110 to select the setting value of the setting parameter "two-sided printing" is included on the display screen W110. The list E110 may be selected from any of "None", "Long Edge" or "Short Edge".

The list E110 indicates that "None" is selected as the setting value of the setting parameter "two-sided printing". This kind of print setting screen is displayed when the values of the registry key relating to the print setting are Duplex=0x00000001(None) and Forced Duplex=0x00000000 (Off). That is, the one-sided printing is not restricted, and further, the standard setting value of the setting parameter "two-sided printing" is the print setting screen on which "None" is selected.

Figure 11:
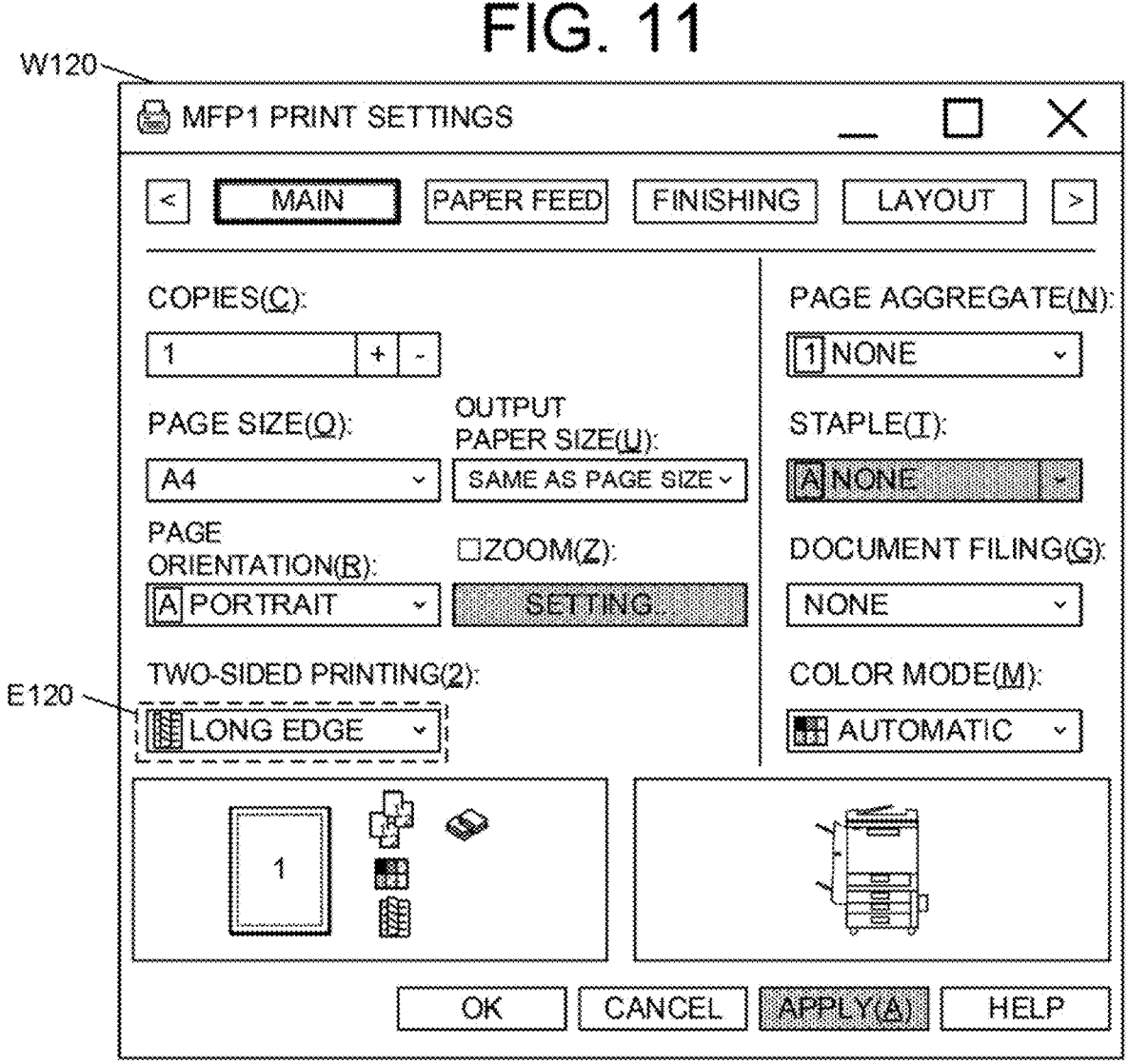
FIG. 11 is a diagram illustrating an operational example of the present embodiment.

FIG. 11 is an example of display screen W120 of another print setting screen. The list E120 to select the setting value of the setting parameter "two-sided printing" is included on the display screen W120.

The list E120 indicates that the "Long Edge" is selected as the setting value of the setting parameter "two-sided printing". This kind of print setting screen displays the value of the registry key relating to the print setting in either of the following two cases.

1 Case in which Duplex=0x00000002 (Long Edge) and Forced Duplex=0x00000000(Off)

Figure 12:
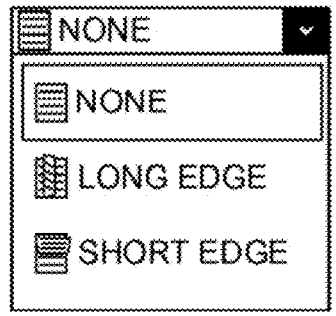
FIG. 12 is a diagram illustrating an operational example of the present embodiment.

In this case, the one-sided printing is not restricted, but the value of the registry key relating to the print setting may indicate that the printing data output by the two-sided printing of the long edge is the standard setting value. In this case, when the list E120 is expanded, a display such as in FIG. 12 is made. That is, it is possible for the user to modify the setting value of the setting parameter "two-sided printing" from the "Long Edge" to "None".

2 Case in which Forced Duplex=0x00000002 (Long Edge)

Figure 13:
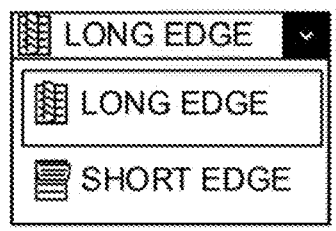
FIG. 13 is a diagram illustrating an operational example of the present embodiment.

In this case, the value of the registry key relating to the print setting may indicate that one-sided printing is restricted, and the print data output by the two-sided printing of the long edge is the standard setting value. In this case, when the list E120 is expanded, a display such as in FIG. 13 is made. That is, it is possible for the user to modify the setting value of the setting parameter "two-sided printing" to "None".

Figure 14:
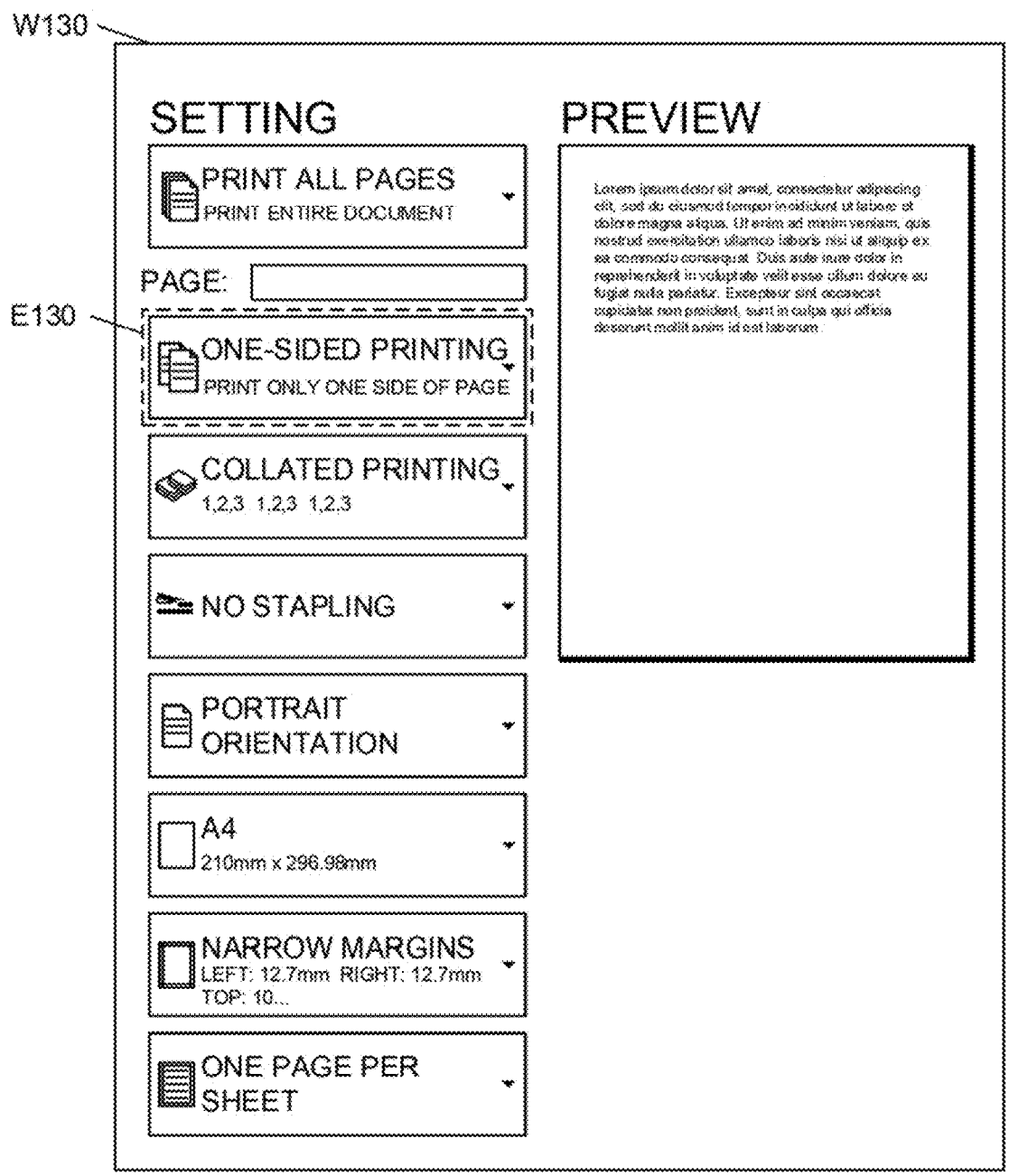
FIG. 14 is a diagram illustrating an operational example of the present embodiment.

Further, FIG. 14 is an example of a display screen W130 of the screen provided in a program which creates and edits the document data, that modifies the print setting data (setting values). The display screen W130 is displayed without reading the value of the registry key relating to the print setting. Therefore, even when the value which restricts one-sided printing is included in the values of the registry key relating to the print setting, one-sided printing can be selected as illustrated in the region E130. Further, the print setting data based on the setting values input and selected on the screen of the display screen W130 is output.

When the operation that outputs the print data from the image formation apparatus 30 based on the document data is performed on the display screen W130, the printer driver modifies the print setting data based on the value of the registry key relating to the print setting. For example, if the value which restricts one-sided printing is included in the values of the registry key relating to the print setting, when "one-sided printing" is included in the print setting data as the setting value, the setting value is modified to "two-sided printing". Specifically, the value Forced Duplex=0x00000002 (Long Edge) is included in the values of the registry key relating to the print setting. In this case, when the setting value of the setting parameter "two-sided printing" of the print setting data is "None", the printer driver modifies the print setting data to the setting which outputs the print data at the long edge. Further, if the value Forced Duplex=0x00000003 (Short Edge) is included in the values of the registry key relating to the print setting, the printer driver modifies the "one-sided printing" setting value to the short edge. In this way, it is possible to ignore the setting value of the print setting on the display screen W130, and prioritize the setting values based on the value of the registry key relating to the print setting.

Note that, if Forced Duplex=0x00000000(None), the setting values of the print setting data on the display screen W130 are prioritized.

The aforementioned description is an example which modified the print setting screen relating to one-sided printing or two-sided printing, and modified the print setting data. It is described that the user can only perform the setting of the double-sided printing by not being able to set single-sided printing as the setting value of the print setting data. However, even the print setting data other than the print setting data relating to one-sided printing or two-sided printing may also be certainly used to restrict and modify the setting values of the print setting data in the same manner. For example, the color mode that can be selected by a user may also be restricted. Specifically, in the case when either of color printing or monochrome printing can be selected as the setting values of the print setting data, color printing may not be selected as the print setting data of the color mode. In this case, only the setting of monochrome printing is possible for the user. In addition thereto, it may be possible to set the value of the registry key relating to the print setting which restricts the setting values which the user may select for the setting parameters such as the size of the recording paper, aggregate print, and whether to perform stapling or hole punching. Further, it is possible to set the value of the registry key relating to the print setting which sets the standard setting value in a part or the entirety of the setting parameters.

Further, when the model of the image formation apparatus is used by a different terminal apparatus 20 or when modifying the function which is restricted by the user attributes, a registry key is stored for each model or user attribute, and the value of each registry key may be applied and reflected.

According to the present embodiment, the setting data relating to the print setting is stored in a part of the setting data of the apparatus, thus, the amount of labor for management is reduced as the installation of a printer driver in the server apparatus and the terminal apparatus is not necessary. Further, the function of a part of the image formation apparatus can be restricted by appropriately applying only the value of the registry key relating to the print setting from the server apparatus to the terminal apparatus. Therefore, even when there is a plurality of image formation apparatuses and when modifying the functions which resist each user attribute, the setting values of the print setting data can be flexibly restricted and modified.

Further, according to the present embodiment, even when a program provided on the screen on which the print setting is possible is used, the print setting data based on the setting (specific setting data relating to the print setting) on the printer driver side can be used. That is, even if the setting on the printer driver side is different than the print setting data set by a program provided on the screen on which the print setting is possible, it is possible to prioritize the print setting data on the printer driver side by the printer driver modifying the print setting data.

Note that, the aforementioned embodiment is described as storing the setting data as the registry data, and reflecting the value of the registry key relating to the print setting by an Active Directory function. However, this may be realized by different methods. For example, the setting data may be stored as a file, and the printer driver may read out the file and modify the print setting data. Further, in this case, the file stored in the terminal apparatus 20 may be updated by transmitting the file from the server apparatus 10 to the terminal apparatus 20.

5. Modification Example

The present disclosure is not limited to the aforementioned embodiment, and various modifications are possible. That is, embodiments obtained by combining technical means that have been modified as appropriate without departing from the spirit and scope of the present disclosure also fall within the technical scope of the present invention.

Further, the programs operated by each apparatus in the embodiments are programs configured to control a CPU and the like (program causing a computer to function) to realize the functions of the aforementioned embodiments. Moreover, the information handled by these apparatuses is temporarily held in a transitory storage device (for example, RAM), and is then stored in various storage devices such as a Read Only Memory (ROM) and an HDD, read out by the CPU as necessary, and edited and written.

Here, a semiconductor medium (for example, a ROM, a non-volatile memory card or the like), an optical recording medium/magneto-optical recording medium (for example, a digital versatile disc (DVD), a magneto optical disc (MO), a mini disc (MD), a compact disc (CD), a Blu-ray (registered trademark) disc (BD) or the like), a magnetic recording medium (for example, magnetic tape, a flexible disk, or the like) can be provided as examples of the recording medium to store the programs. Further, in addition to realizing the functions of the aforementioned embodiments by executing loaded programs, the functions of the present disclosure are realized by the programs running cooperatively with an operating system, other application programs, or the like in accordance with instructions included in those programs.

Further, when delivering these programs to market, the programs can be stored in a portable recording medium, or transferred to a server computer connected via a network such as the Internet. In this case, the storage device of the server computer may certainly be included in the present disclosure.

DESCRIPTION OF REFERENCE NUMERALS 1 printing system
10 server apparatus
100 controller
110 display section
120 operation input section
130 communication section
140 storage
142 registry data
144 registry data modification program
146 registry data application program
20 terminal apparatus
200 controller
210 display section
220 operation input section
230 communication section
240 storage
242 registry data
244 printer driver
30 image formation apparatus
300 controller
310 image input section
320 image formation section
330 display section
340 operation input section
350 communication section
360 storage
362 print data storage region
364 print setting data storage region

What is claimed is:

1. A printing system comprising:
a terminal apparatus with a printer driver that is installed in the terminal apparatus and generates data for an image formation apparatus based on print setting; and
a server apparatus,
the terminal apparatus and the server apparatus being connected to each other,
the server apparatus including:
a first setting device that sets specific setting data relating to the print setting, and
an application device that applies the specific setting data to the terminal apparatus, and the terminal apparatus including:
a storage that stores setting data representing setting of the terminal apparatus,
a reflector that reflects the specific setting data in the setting data, and
a controller that refers to the setting data to perform control to modify the print setting,
wherein:
the first setting device in the server apparatus is capable of setting, as the specific setting data, information representing restriction of a predetermined print setting;
the terminal apparatus further includes a second setting device that is capable of setting the print setting;

whenever the specific setting data include information representing restriction of a predetermined print setting, the controller uses print setting after reference to the setting data as print setting corresponding to the information representing restriction of a predetermined print setting;

the second setting device displays a print setting screen and is capable of setting the print setting by the print setting screen displayed; and when the print setting set by the second setting device is restricted by the information representing restriction of a predetermined print setting, the controller preferentially sets the print setting after the reference to the setting data as print setting.

2. The printing system according to claim 1, wherein when the setting data include information representing restriction of a predetermined print setting, the second setting device of the terminal apparatus displays a print setting screen based on print setting corresponding to the information representing restriction of a predetermined print setting.

3. The printing system according to claim 1, wherein the print setting is print setting for one-sided printing or two-sided printing, and
the setting data include information only allowing setting of two-sided printing as print setting.

4. The printing system according to claim 1, wherein the print setting is print setting for monochrome printing or color printing, and
the setting data include information only allowing setting of monochrome printing as print setting.

5. The printing system according to claim 1, wherein the setting data are a registry key.

6. A terminal apparatus with a printer driver that is installed in the terminal apparatus and generates data for an image formation apparatus based on print setting,
the terminal apparatus being connectable with a server apparatus and comprising:
a storage that stores setting data representing setting of the terminal apparatus;
a reflector that reflects specific setting data set in the server apparatus in the setting data; and
a controller that refers to the setting data to perform control to modify the print setting,
wherein:
the server apparatus is capable of setting, as the specific setting data, information representing restriction of a predetermined print setting,
the terminal apparatus further includes a setting device that is capable of setting the print setting,
whenever the specific setting data includes information representing restriction of a predetermined print setting, the controller uses print setting after reference to the setting data as print setting corresponding to the information representing restriction of a predetermined print setting,
the setting device displays a print setting screen and is capable of setting the print setting by the print setting screen displayed, and
when the print setting set by the setting device is restricted by the information representing restriction of a predetermined print setting, the controller preferentially sets the print setting after the reference to the setting data as print setting.

7. A method for print setting in a printing system including:
a terminal apparatus with a printer driver that is installed in the terminal apparatus and generates data for an image formation apparatus based on print setting; and
a server apparatus,
the terminal apparatus and the server apparatus being connected to each other, the method comprising:
setting, with the server apparatus, specific setting data relating to the print setting;
applying, with the server apparatus, the specific setting data to the terminal apparatus;
storing, with the terminal apparatus, setting data representing setting of the terminal apparatus;
reflecting, with the terminal apparatus, the specific setting data in the setting data; and
referring, with the terminal apparatus, to the setting data to modify the print setting, wherein
the server apparatus is capable of setting, as the specific setting data, information representing restriction of a predetermined print setting,
the terminal apparatus is capable of setting the print setting,
the terminal apparatus uses print setting after reference to the setting data as print setting corresponding to the information representing restriction of a predetermined print setting whenever the specific setting data includes information representing restriction of a predetermined print setting,
the terminal apparatus displays a print setting screen and is capable of setting the print setting by the print setting screen displayed, and
when the print setting set by the server apparatus is restricted by the information representing restriction of a predetermined print setting, the terminal apparatus preferentially sets the print setting after the reference to the setting data as print setting.

* * * * *